*INVENTOR.*
RENVILLE H. McMANN, JR.
*BY*
Brumbaugh, Free, Graves & Donohue
his *ATTORNEYS*

INVENTOR.
RENVILLE H. McMANN, JR.
BY
Brumbaugh, Free, Graves & Donohue
his ATTORNEYS INVENTOR.
RENVILLE H. McMANN, JR.
BY
Brumbaugh, Free, Graves & Donohue
his ATTORNEYS INVENTOR.
RENVILLE H. McMANN, JR.
BY
Brumbaugh, Free, Graves & Donohue
his ATTORNEYS Feb. 8, 1966 R. H. McMANN, JR 3,234,327

HIGH-RESOLUTION SCANNING SYSTEM HAVING LOW-RESOLUTION COMPONENTS

Filed March 31, 1961 6 Sheets-Sheet 5

INVENTOR.
RENVILLE H. McMANN, JR

BY Brumbaugh, Free, Graves & Donohue his ATTORNEYS

*INVENTOR.*
RENVILLE H. McMANN, JR.
*BY*
Brumbaugh, Free, Graves & Donohue
his *ATTORNEYS*

3,234,327

HIGH-RESOLUTION SCANNING SYSTEM HAVING LOW-RESOLUTION COMPONENTS

Renville H. McMann, Jr., Stamford, Conn., assignor to Columbia Broadcasting System, Inc., New York, N.Y., a corporation of New York Filed Mar. 31, 1961, Ser. No. 99,850

14 Claims. (Cl. 178—6.8)

The present invention relates to novel and highly effective means for the electronic transmision of visual data and more particularly of data recorded on a medium such as film. Such data might consist, for example, of information from photographic reconnaissance, side-looking radar, infrared scanners, or other means capable of producing a record.

A number of systems have heretofore been devised for the electronic transmission of visual data, but such systems are not well adpated to use in cases where space and weight limitations are of great importance as, for example, in artificial satellites and high-flying reconnaissance aircraft. This stems from the fact that present day electronic scanning devices of a size small enough for convenient use in such satellites and aircraft have considerably less resolving power than have present day high resolution recording media. The result is that much of the potential value of a high resolution record medium is lost in cases where the record itself is not immediately available or cannot be recovered and it is necessary to rely on a data transmission system to obtain the information which the medium has recorded.

It is an object of the invention, accordingly, to provide new and improved means for the electronic transmission of visual data.

Another object of the invention is to provide means for increasing the resolving power of a conventional electronic scanning device without materially increasing the size, weight or cost thereof.

A further object of the invention is to provide means for the simultaneous generation by a single line scanning device of a plurality of scanning lines for the simultaneous scanning of a plurality of objects or a plurality of parts of an object.

Still another object of the invention is to provide means for the exact positioning of a plurality of short scanning lines end-to-end so as to provide, in effect, a single long scanning line.

A further object of the invention is to provide means for the generation by a single line scanning device of a sufficient number of scanning lines transversely of a record strip to scan the width thereof, each scanning line being small enough to have a resolving power at least as great as that of the record strip.

Still another object of the invention is to provide means for the sequential transmission to a video link of different sets of data received simultaneously by a plurality of light sensitive devices.

A further object of the invention is to provide means for the reception of information transmitted over a video link in the novel manner of the invention and the presentation thereof on a record strip in a manner faithful to the information contained on the scanned record strip.

Broadly speaking, the present invention contemplates the high-resolution scanning of an object to be reproduced by a relatively-low-resolution scanning device. The scanning device is in effect given a resolving power adequate to reproduce fine structure in the object. This is accomplished by optical means co-operating with the scanning device for producing a composite scanning line comprising a succession of line scans across the object, each line scan being a reduced image of a scanning line generated by the scanning means and the end of one line being in substantial registry with the beginning of the next so that there is neither gap nor overlap and the lines preferably being colinear. In this fashion, a high degree of resolution can be secured with equipment having materially smaller space and weight requirements than would otherwise be possible. The signal output from the scanning equipment, which may be located in an airborne vehicle, for example, is transmitted over suitable video link equipment to a receiving station where the received signals may be utilized to form a reproduction of the object originally scanned.

For a better understanding of the invention, reference is made to the following detailed description of several representative embodiments, taken in conjunction with the accompanying drawings in which.

While the invention is susceptible of wide utility in a number of different applications, it will be described below, for purposes of illustration, as embodied in apparatus for transmitting information recorded on film in an airborne vehicle to a remote receiving station and for reproducing the transmitted information at that station.

Figures 1, 4:
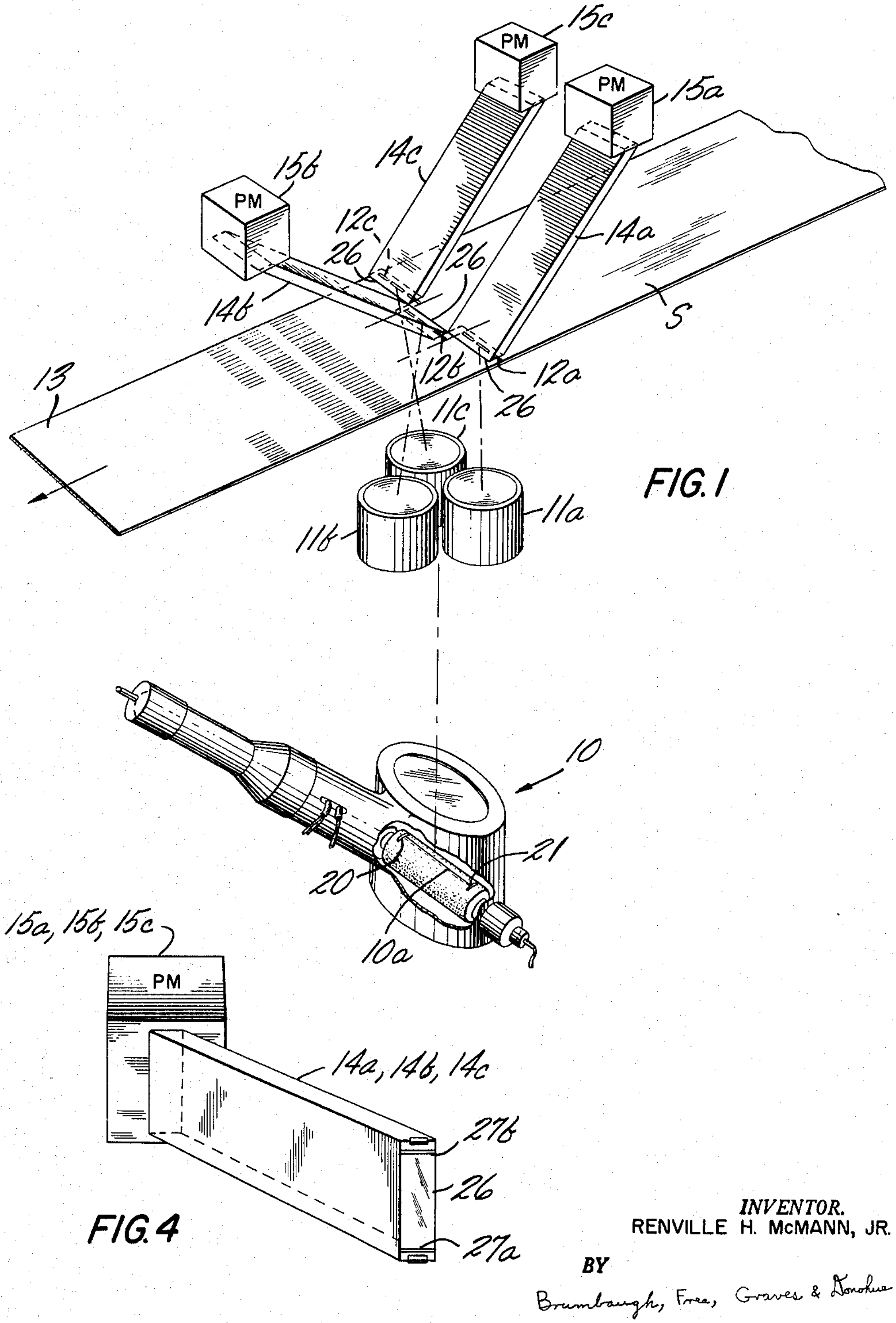
FIG. 1 is a diagrammatic representation of a scanning system constructed according to the invention.
FIG. 4 is a isometric perspective view of a light tube and a calibrator with fiduciary marks for use in accordance with the invention.

Referring first to FIG. 1, the information to be transmitted may be, for example, an image previously recorded on a strip S of photographic film in an aircraft flying at high altitude. The film strip S may be moved lengthwise in the direction of the arrow at a uniform speed by any suitable film transport mechanism (not shown). As the film strip S moves, successive adjacent elemental portions of the image thereon in linear paths extending transversely of the film strip S are adapted to be scanned to produce electric signals for transmission to a remote receiving station. While the scanning may be done by any suitable line scanning device having the requisite resolution, it is preferred to use a so-called "line scan" tube. This is a form of television tube in which a high intensity beam of electrons is caused to scan repeatedly a single line on a phosphor carrying drum which is rotated at high speed to prevent overheating of the phosphor material.

According to the invention, a plurality of images of the scanning line from a line scan tube are focussed on the film strip S such that the images are colinear, with the end of one line image substantially in registry with the start of the next line image so that there is neither gap nor overlap.

The characteristics of the optical means employed for this purpose will depend upon the resolving power of the line scan tube as compared to that of the film to be scanned. In the present state of the art, with available line scan tubes having a four-and-a-half-inch drum, the smallest practical spot size on the anode (typically a revolving drum) is about 1 mil. in diameter. This permits a definition of 4,500 picture elements per line. However, 70 mm. high resolution airborne films may have as many as 13,000 TV scanning elements across its width. With such equipment, therefore, it would be necessary to apply the full resolving power of the line scan tube to no more than $\frac{1}{2.89}$ of the width of the film and to do so at least 2.89 times across the width of the film in order to reap the full benefit of the film's resolving power. In accordance with the present invention, the resolving power of the scanning means is matched to the resolving power of the record medium by reproducing the scanning line on the record medium a number of times at least substantially as great as the maximum number of information bits to be scanned divided by the number of information bits readable by the scanning line. Further, each reproduction of the scanning line on the record medium has a maximum length substantially no greater than the length of each line to be scanned divided by the smallest number of reproductions of the scanning line on the record medium which is permissible in accordance with this embodiment of the invention. In the example given in the preceding paragraph, the scanning line is reproduced on the record medium a number of times at least substantially as great as 13,000 divided by 4,500, or 2.89, and each reproduction of the scanning line on the record medium has a maximum length substantially no greater than the length of each line to be scanned divided by 2.89.

More particularly, the representative embodiment of the invention shown in FIG. 1 includes three lens barrels 11*a*, 11*b* and 11*c* for use in conjunction with the line scan tube 10, producing three scanning lines 12*a*, 12*b* and 12*c* upon the film strip S, each covering a different fractional part of the width of the scanned film with every sweep of the scanning spot across the drum of the line scan tube 10. No single scanning line reproduced on the record medium has a length greater than $\frac{1}{2.89}$ of the width of the film. As seen in FIG. 1, the beginning of the transmitted portion of the line 12*a* coincides with the near edge of the film strip S, the far end of the transmitted portion of the line 12*a* corresponds to the near end of the transmitted portion of the line 12*b*, the far end of the transmitted portion of the line 12*b* corresponds to the near end of the transmitted portion of the line 12*c*, and the far end of the transmitted portion of the line 12*c* coincides with the top edge of the film strip S.

Thus, the three scanning lines generated by the line scan tube 10 are so arranged as to produce, in effect, a single scanning line across the width of the film. However, in order to facilitate the viewing of the three separate lines by photosensitive devices to be described later, one of the scanning lines, say the scanning line 12*b*, may be displaced longitudinally along the film strip S with respect to the scanning lines 12*a* and 12*c*. Preferably, the velocity of the film should not be so great as to leave unscanned gaps in the film between successive scanning lines.

The scanning lines 12*a*, 12*b* and 12*c* are naturally visible from the opposite side of the film, and a plurality of light tubes 14*a*, 14*b* and 14*c* may be so arranged behind the film 13 as to direct the light from the scanning lines 12*a*, 12*b* and 12*c* to a plurality of photosensitive devices such as the photomultiplier tubes 15*a*, 15*b* and 15*c* which supply signals to a video link. Actuation of the photomultiplier tubes 15*a*, 15*b* and 15*c* by reflected light is also possible, but actuation by transmitted light is preferred.

Figure 2:
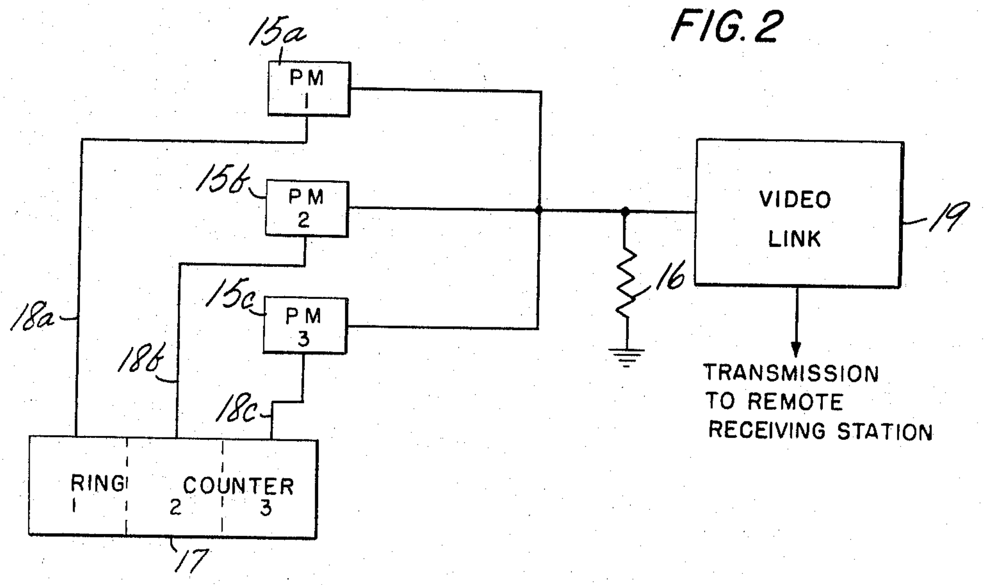
FIG. 2 is a schematic representation of an electrical system for transmitting the response of the scanning system of FIG. 1 to a remote receiving station.

The signals from the photomultiplier tubes 15*a*, 15*b* and 15*c*, are transmitted sequentially over the video link 19 (FIG. 2) to a remote receiving station. To this end, the photomultiplier tubes 15*a*, 15*b* and 15*c* may be connected to a common output resistor 16 (FIG. 2) and may be adapted to be rendered operative sequentially by signals from a conventional ring counter 17 transmitted over conductors 18*a*, 18*b* and 18*c*. The rest of the transmission link 19 may be conventional.

In order that the original data may be transmitted accurately, it is essential that each of the scanning lines 12*a*, 12*b* and 12*c* be properly positioned relatively to one another. Further, although it is not necessary that all of the scanning lines be of equal length, it is desirable in order to reap the full benefit of the resolving power of the film that all of the scanning lines be so small that the images of the scanning spot which are formed by the lens barrels 11*a*, 11*b* and 11*c* upon the film 13 are at least as small as the smallest informational bit which the film may contain.

In order to enable the scanning lines to meet these requirements, the drum 10*a* of the line scan tube 10 is provided with fiduciary marks 20 and 21 (which may conveniently be formed by removing phosphor from a portion of the drum 10*a*) near the opposite ends of the line traced out by the scanning beam. Preferably, the fiduciary marks 20 and 21 extend only part way around the periphery of the drum 10*a*. When the scanning beam impinges on a part of the drum 10*a* which is devoid of phosphor material, the line scan tube 10 momentarily emits less light, and the outputs of the photomultiplier tubes 15*a*, 15*b* and 15*c* reflect this fact.

Figure 3:
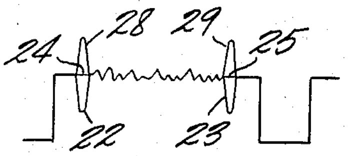
FIG. 3 is a graph of the output of one of the photomultiplier tubes in the system of FIG. 1 as presented by a cathode ray oscilloscope.

Accordingly, if the output of any one of the photomultiplier tubes 15*a*, 15*b* and 15*c* is fed to a cathode ray oscilloscope synchronized with the scanning frequency of the line scan tube, the oscilloscope will generate a trace having pips 22 and 23 (FIG. 3) caused by the passage of the scanning beam over the fiduciary marks 20 and 21. However, inasmuch as the fiduciary marks 20 and 21 do not extend all the way around the drum of the line scan tube 10, the bases 24 and 25 of the pips 22 and 23 will be closed. This results from the fact that as the drum 10*a* rotates, at times a part of the drum having no fiduciary marks will face the scanning beam, the fiduciary marks being then on the opposite side of the drum. At such times, pips 22 and 23 will not be generated.

For line calibration purposes, there are placed in front of the light tubes 14*a*, 14*b* and 14*c* at the ends thereof adjacent to the film strip S a calibrated slide 26 of the type shown in FIG. 4 which may have two clear fiduciary marks 27*a* and 27*b* formed on a background of, say 90% transmission. The presence of these calibrating slides between the scanning lines 12*a*, 12*b* and 12*c* and the photomultiplier tubes 15*a*, 15*b* and 15*c* will produce on the face of a cathode ray oscilloscope connected as described above (FIG. 3) pips 28 and 29 on the opposite side of the base line from the pips 22 and 23. This is owing to the fact that, as the image of the scanning dot which is formed by the lens barrels 11*a*, 11*b* and 11*c* upon the film strip S traverses the clear fiduciary marks 27*a* and 27*b*, more light will be transmitted to the light tubes 14*a*, 14*b* and 14*c* than will be transmitted when said image is in alignment with a part of the slide which transmits only 90% or so of the light which impinges upon it.

It will be understood that when the pips 28 and 29 occur at the same displacement of the scanning trace as the pips 22 and 23, the part of the scanning line 12*a*, for example, which corresponds to the distance on the drum 10*a* between the fiduciary marks 20 and 21 will have the same length as the distance between the fiduciary marks 27*a* and 27*b*, and the beginning and end of said part will be aligned with the fiduciary marks 27*a* and 27*b*.

Since the calibrating slide can be easily adjusted to mark off the width of the film strip S as the case may require, it is possible to adjust the length and location of the scanning line 12*a* with great precision. In similar fashion, by adjusting the focus of the lens barrels 11*b* and 11*c*, the portions of the scanning lines 12*b* and 12*c* on the film strip S which correspond to the distance on the drum 10*a* between the fiduciary marks 20 and 21 can be made of the same length as the distance between, and can be aligned with, the fiduciary marks 27*a* and 27*b* on the calibrating slides respectively associated therewith.

It will be understood, of course, that the length of the lines 12*a*, 12*b* and 12*c* can be made as small as may be thought necessary by selecting the lens barrels 11*a*, 11*b* and 11*c* with sufficiently short focal length or, less advantageously, by placing the lines scan tube 10 at a sufficient distance from the lens barrels 11*a*, 11*b* and 11*c*. It will be understood, too, that additional scanning lines can be generated by the same tube as the case may require.

Figure 5:
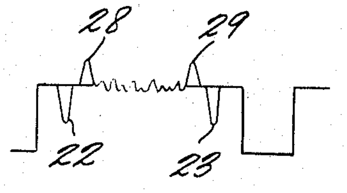
FIG. 5 is a graph of the output of one of the photomultiplier tubes in FIG. 1 as presented by a cathode ray oscilloscope, showing improper adjustment of the corresponding optical system.
Figure 6:
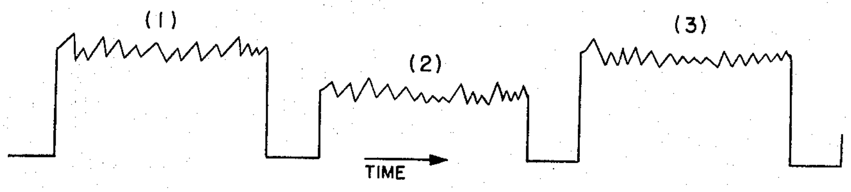
FIG. 6 is a graph of a typical sequential signal output transmitted by the system shown in FIG. 2.

FIG. 5 illustrates a typical trace such as might be produced on the cathode ray tube when the magnification of one of the lens barrels 11*a*, 11*b* or 11*c* is too great so that the corresponding scanning line impinging on the film 13 has too great a length. This condition may be corrected by shortening the focal length of the lens barrel in question, if possible, or, in any event, by substituting a lens barrel of shorter focal length.

Figures 7, 8:
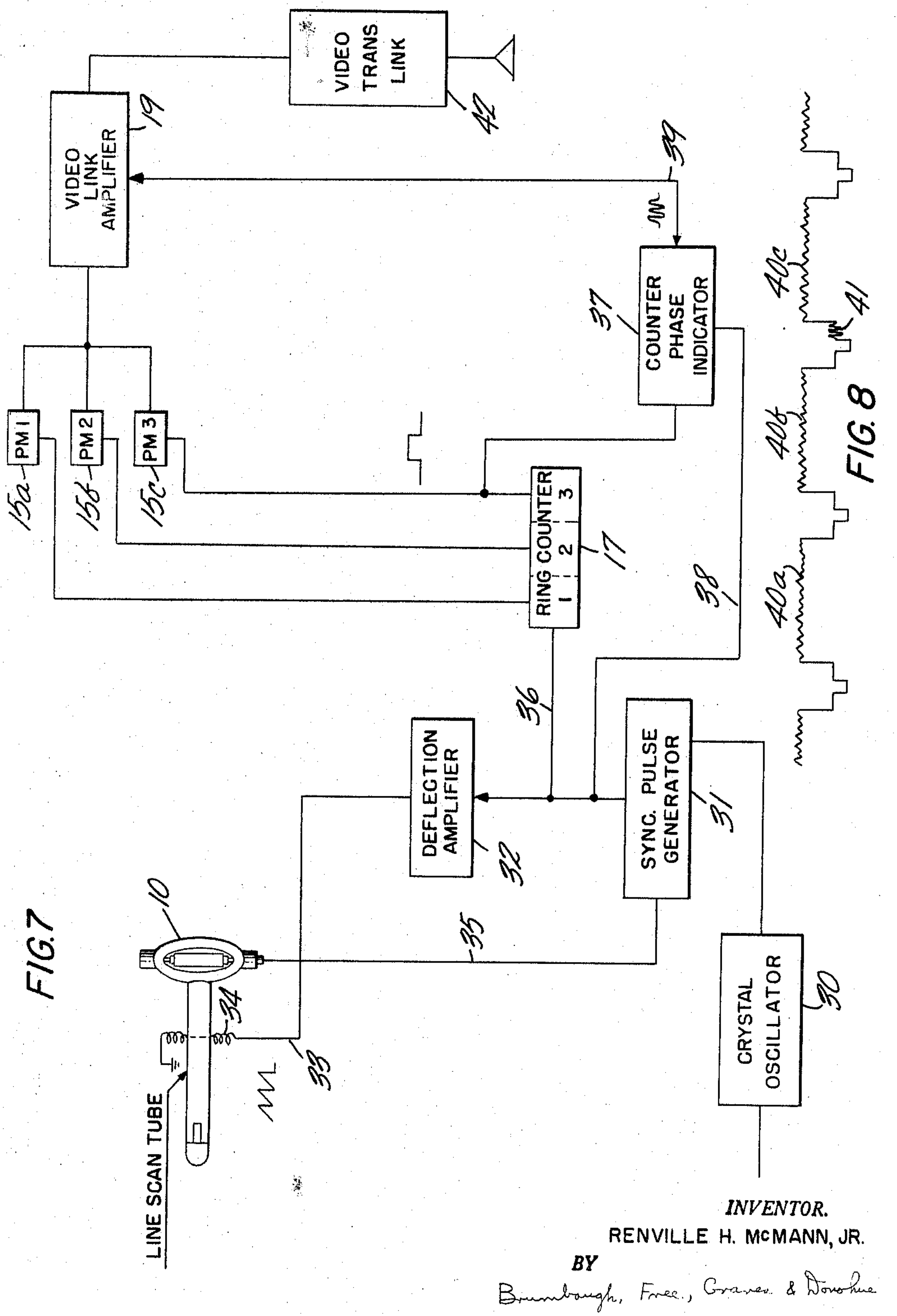
FIG. 7 is a schematic representation of a typical control circuit for the scanner system shown in FIG. 1.
FIG. 8 is a graph representing a typical output from the video amplifier.

FIG. 7 illustrates a typical control system and video link for the scanning apparatus shown in FIG. 1. Alternating current from a crystal oscillator 30 controls a synchronous pulse generator 31 which supplies an output to a deflection amplifier 32. The deflection amplifier 32 supplies a sawtooth pulse through a lead 33 to a line scan deflection coil 34 of the line scan tube 10, thus controlling the sweep of the scanning spot.

The synchronous pulse generator 31 also supplies signals over a lead 35 for blanking the return trace on the line scan tube 10 in the conventional manner. The ring counter 17 also receives synchronizing signals from the synchronous pulse generator 31 over the leads 36.

Suitable means must be provided for synchronizing the scanning beam or beams used to reproduce the transmitted data at the receiving station with the scanning beam at the transmitting station. To this end, an identifying signal may be impressed on that part of the composite video signal representing one of the three scanning lines 12*a*, 12*b* and 12*c* of FIG. 1. This might be done, for example, by a counter phase indicator device 37 which receives synchronizing signals from the pulse generator 31 over a lead 38 and which also receives a signal from the line between the ring counter 17 and the photomultiplier 15*c*. The counter phase indicator 37 supplies an identifying pulse similar to the reference color burst signal used in conventional color television practice over a line 39 to the video amplifier 19.

FIG. 8 is a graph representing a typical output from the video amplifier 19, the scanning line portions 40*a*, 40*b* and 40*c* representing the original scanning lines 12*a*, 12*b* and 12*c* and the high frequency pulse 41 on the back porch of the trace 40*c* identifying that trace as corresponding to the output of the photomultiplier tube 15*c*.

The output of the video amplifier 19 is supplied to a video transmission link 42 which may be a wireless transmitter if the original data is being scanned on an aircraft or a conventional coaxial cable link in the event both the transmitting and receiving stations are located on the ground.

Figure 9:
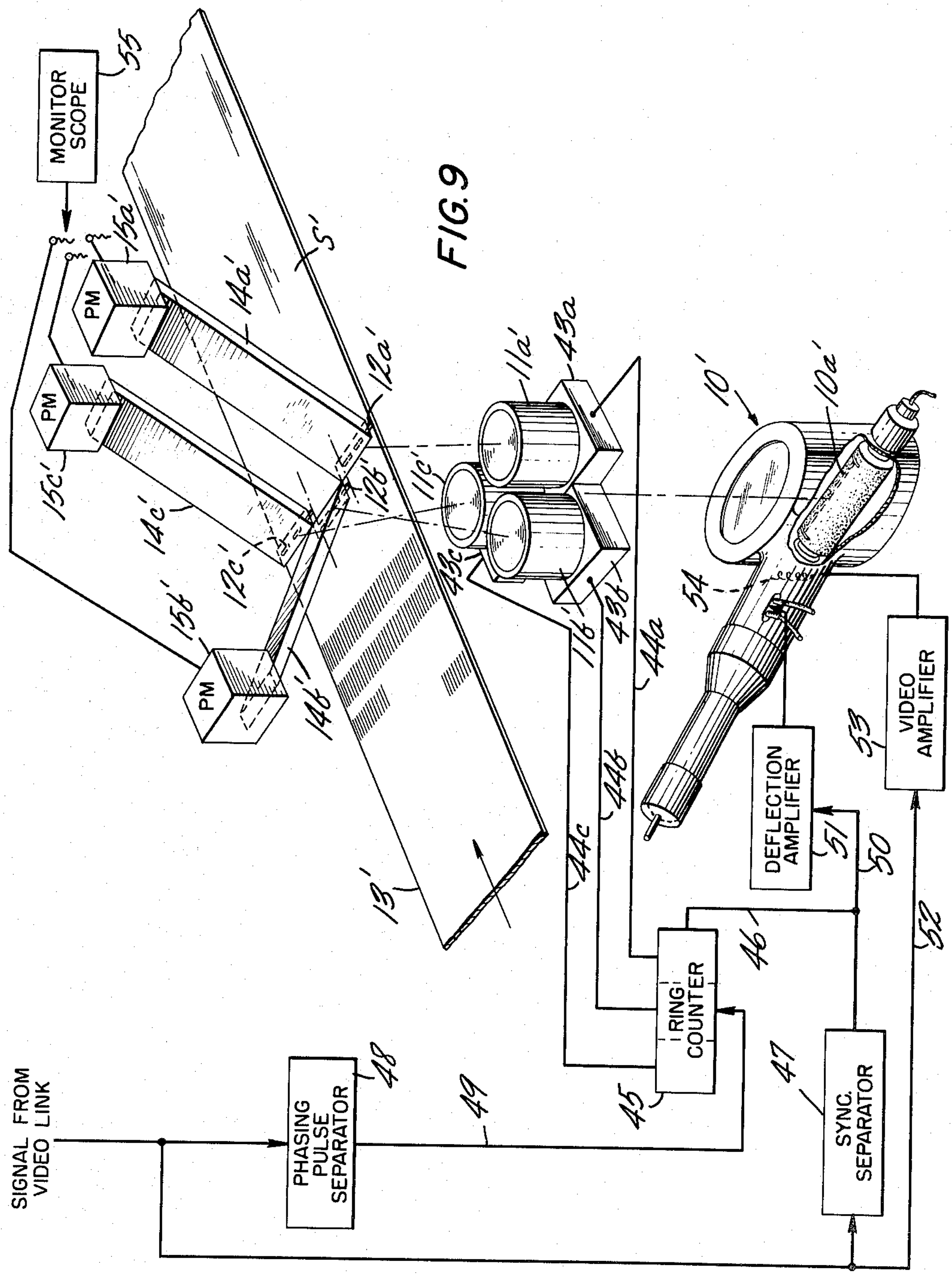
FIG. 9 is a diagrammatic representation of one form of apparatus for reproducing the transmitted data on film at a remote location.

One form of apparatus for reproducing the data on film at a remote location is shown in FIG. 9. It comprises means for transporting a film strip S′ longitudinally in the direction indicated by the arrow at the same speed as that of the film strip S carrying the original data (FIG. 1). A single line scan tube 10′ may again be used, the light therefrom being directed through lens barrels 11*a′*, 11*b′* and 11*c′* to produce three scanning lines 12*a′*, 12*b′* and 12*c′* on the film S′. The light from each of the lens barrels 11*a′*, 11*b′* and 11*c′* is transmitted through suitable modulator devices such as a plurality of Kerr cells 43*a*, 43*b* and 43*c*, respectively, which are normally opaque but are rendered light-transmitting sequentially by signals applied thereto over the leads 44*a*, 44*b* and 44*c* from a ring counter 45 synchronized with the ring counter 17 (FIG. 2) at the sending end of the system.

To this end, the ring counter 45 receives regenerated synchronizing pulses over a line 46 from a conventional synchronizing pulse separator device 47 which receives an output from the video link 19. This causes the ring counter 45 to operate the Kerr cells in synchronism with the ring counter 17 in the sending equipment. Phasing of the ring counter 45 within the ring counter 17 is effected by a phasing pulse separator 48 which responds to the phasing pulse 41 (FIG. 8) in the input from the video link and supplies a signal to the ring counter 45 over a line 49 causing the latter to operate in phase with the ring counter 17.

The synchronizing signal separator 47 also supplies regenerated synchronizing pulses over a line 50 to a deflection amplifier 51 which controls the deflection of the cathode ray beam in the line scan tube 10′. The output from the video link is also supplied over a line 52 to a conventional video amplifier 53 which applies modulating signals to a control grid 54 of the line scan tube 10′ so that the electron beam impinging on the drum 10*a′* is modulated in accordance with the video intelligence carried by the received signals.

The scanning lines 12*a′*, 12*b′* and 12*c′* impinging on the film strip S′ may be adjusted as to length and position by means of calibrators in the same manner as that described above. For this purpose, light tubes 14*a′*, 14*b′* and 14*c′* may be provided to collect the light from the three scanning beams and direct it to three photo-multiplier tubes 15*a′*, 15*b′* and 15*c′*. The outputs of the tubes 15*a′*, 15*b′* and 15*c′* may be connected selectively to a monitoring oscilloscope 55*a* for comparison with the signal produced by the fiduciary marks 20′ and 21′ (FIG. 1) on the line scan tube 10′.

Figure 10:
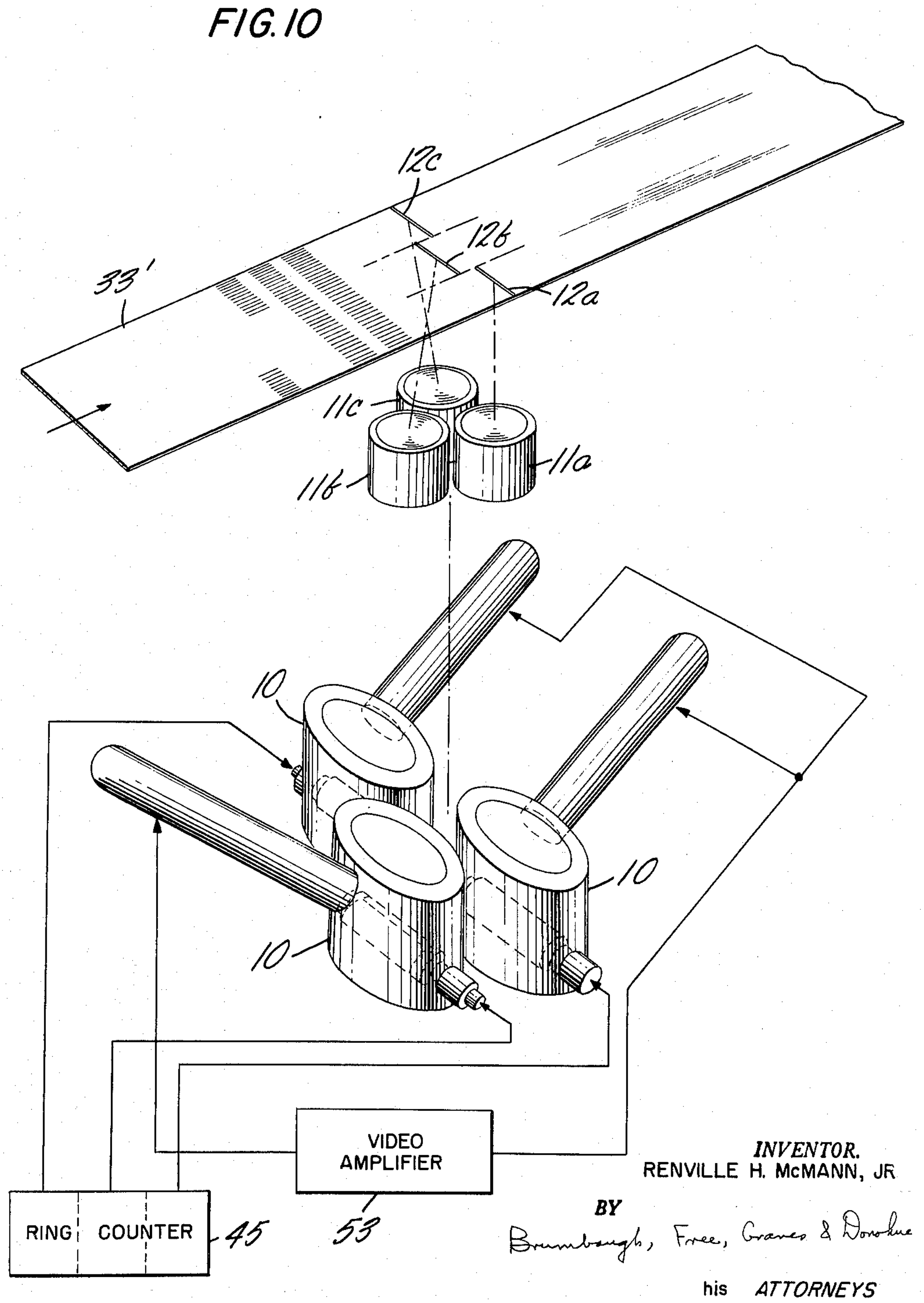
FIG. 10 is a diagrammatic representation of part of another apparatus for reproducing the transmitted data on film at a remote location.

As an alternative, three separate line scan tubes 10*e*, 10*f* and 10*g* can be used to reproduce a single scanning line on the film 33′, as shown in FIG. 10, two of the tubes always being blanked out so that each tube traces out one in sequence. This can be readily effected by appropriate blanking signals derived from the ring counter device 25, the proper phase relation again being maintained by the phasing signal burst 41 (FIG. 8). In each of these, the video output from the amplifier 53 would be fed to the control grids of all three of the line scan tubes. If the receiving station is on the ground, as it normally would be, there is not the same objection to the use of three line scan tubes as there would be in the limited confines of an aircraft or satellite.

Figures 11, 12:
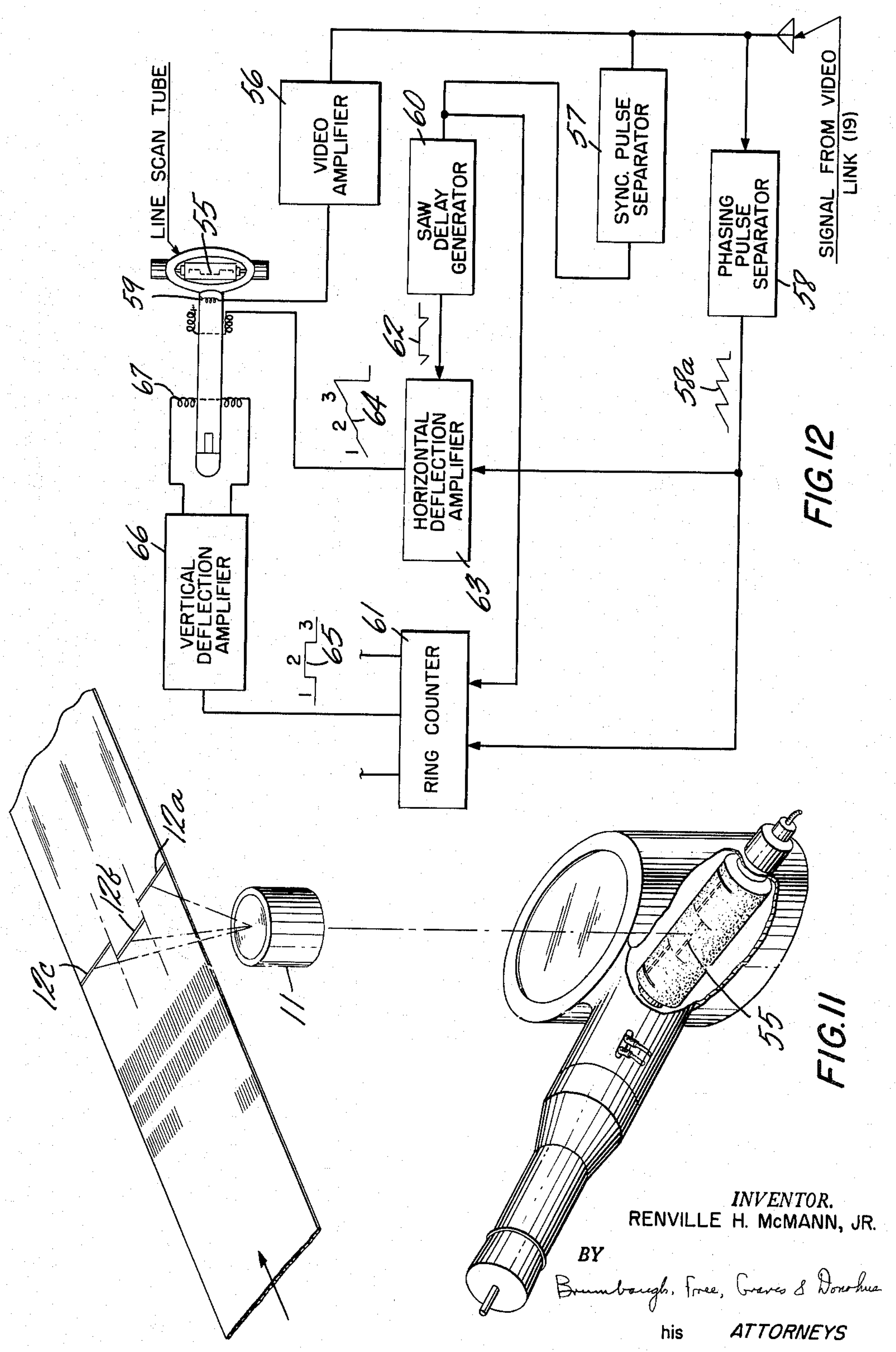
FIG. 11 is a diagrammatic representation of part of a third apparatus for reproducing the transmitted data on film at a remote location.
FIG. 12 is a schematic representation of a typical circuit employed in connection with the apparatus of FIG. 11.

Instead of three tubes, a large high resolution line scan tube 10*h* could be used, as shown in FIG. 11. This tube would be adapted to generate a single line with the middle portion 55 displaced longitudinally as indicated.

A typical reproducer circuit utilizing a single large high resolution line scan tube is shown in FIG. 12. Here, the signal from the video link 19 is supplied to a video amplifier 56, a synchronizing pulse separator 57 and a phasing pulse separator 58. The output of the video amplifier 56 is supplied to the control grid 59 of the line scan tube 10*h* so that it modulates the intensity of the cathode ray beam. The synchronizing pulse separator 57 supplies synchronizing pulses to a sawtooth delay generator 60 which has an output waveform as indicated at 62. The outputs of the sawtooth delay generator 60 and of the phasing pulse separator 58 (having an output waveform as indicated at 58*a*) are fed into a horizontal deflection amplifier 63. The output of the horizontal deflection amplifier 63, which is the sawtooth wave 58*a* modified by the waveform 62, is indicated at 64. The outputs of the phasing pulse separator 58 and the synchronizing pulse separator 57 are also supplied to a ring counter 61 which feeds an output pulse of the waveform indicated at 65 to a vertical deflection amplifier 66 driving a vertical deflection coil 67 in the line scan tube 10*h*. It will be understood that this will cause the line traced by the line scan tube to comprise two colinear portions and an intermediate portions 55 (FIG. 11) displaced along the circumference of the drum.

Thus, there has been provided in accordance with the invention novel and highly effective means for the electronic transmission of visual data, whereby improved resolving power can be achieved with scanning means of minimum size and weight.

The specific embodiments described above are intended merely to be illustrative and are obviously susceptible of modification in form and detail within the spirit of the invention. For example, the initial record may be made on media other than transparent film. In the event an opaque medium is used, reflection scanning techniques may be used. The recorded data may be aerial photographs, or information from other flight borne devices, such as side-looking radar or infrared scanners, for example. The control and transmission systems described may incorporate components other than those shown provided that they are capable of performing the desired functions. Other modifications will be apparent to those skilled in the art.

Therefore, the invention is not to be limited to the specific embodiments described above and illustrated in the drawings but is intended to encompass all modifications falling within the scope of the following claims.

I claim:

1. In scanning apparatus, the combination of a radiant energy source adapted to generate concentration of radiant energy moving linearly and repetitively between predetermined spatial limits, first optical means disposed to receive said radiant energy concentration and to produce a first image thereof moving between second predetermined spatial limits on an object plane, second optical means disposed to receive said radiant energy concentration and to produce a second image thereof moving between third predetermined spatial limits on said object plane, said first and second images being generated simultaneously first photosensitive means responsive to radiant energy from said first image, second photosensitive means responsive to radiant energy from said second image, and means operated in time relation with said moving concentration of radiant energy for rendering said first and second photosensitive means alternately operative.

2. In apparatus for scanning intelligence recorded on a record medium, the combination of means for transporting a record medium along a given path, a radiant energy source adapted to generate a concentration of radiant energy moving linearly and repetitively between predetermined limits, first optical means disposed to receive said radiant energy concentration and to produce a first image thereof moving between first predetermined spatial limits on a record medium in said given path, second optical means disposed to receive said radiant energy concentration and to produce a second image thereof moving between second predetermined spatial limits on a record medium in said given path, said first and second images being generated simultaneously, first photosensitive means responsive to radiant energy from said first image, second photosensitive means responsive to radiant energy from said second image, means operated in timed relation with said moving concentration of energy for rendering said first and second photosensitive means alternately operative, and link means connected to said first and second photosensitive means for transmitting the responses thereof sequentially to a receiving location.

3. Scanning apparatus as defined in claim 2 in which said link means is a video transmission system including means for generating synchronizing signals for combination with the responses of said first and second photosensitive means, and means for imparting phase identification to at least one of the responses of said first and second photosensitive means.

4. In recording apparatus, the combination of a moving record medium a radiant energy source adapted to generate a concentration of radiant energy effecting repetitive movements between predetermined spatial limits, successive ones of said repetitive movements following the same straight line, first optical means disposed to receive said radiant energy concentration and to produce a first image thereof moving between second predetermined spatial limits in a recording plane on said record medium, second optical means disposed to receive said radiant energy concentration and to produce a second image thereof moving between third predetermined spatial limits in said recording plane, first and second shutter means interposed in the image paths of said first and second optical means, respectively, and means for modulating said radiant energy concentration in accordance with intelligence to be recorded.

5. Recording apparatus as defined in claim 4 in which the lines traced by said first and second images are parallel and the beginning of one of said lines is substantially in registry with the end of the other of said lines.

6. Recording apparatus as defined in claim 4 together with means operated in timed relation with said moving concentration of radiant energy for rendering said first and second shutter means alternately operative.

7. Recording apparatus as defined in claim 4 together with means operated in timed relation with said moving concentration of radiant energy for rendering said first and second shutter means alternately operative, said last-named means incorporating means responsive to a phasing signal.

8. Apparatus comprising scanning means for producing first and second concentrations of radiant energy adapted to scan different portions of an object plane, photosensitive means responsive to said first and second radiant energy concentrations, means responsive to said first and second radiant energy concentrations for generating a first signal representative of the desired limits of said portions, means responsive to said first and second radiant energy concentrations for generating a second signal representative of the actual limits of said portions, means responsive to said first and second signals for comparing said first and second signals, and means for directing said first and second radiant energy concentrations to conform said actual limits to said desired limits.

9. Apparatus as defined in claim 8 in which said means for generating said first signal comprises radiant-energy-transmission means for transmitting said first and second concentrations of radiant energy to said photosensitive means, said radiant-energy-transmission means having a portion which, in response to bombardment by radiant energy of a given characteristic, gives rise to an output of said photosensitive means different from the output produced when other portions of said radiant-energy-transmission means are bombarded by radiant energy of said given characteristic.

10. Apparatus as defined in claim 8 in which said means for generating said second signal comprises a portion of said scanning means which, in response to bombardment by radiant energy of a given characteristic, gives rise to an output of said scanning means different from the output produced when other portions of said scanning means are bombarded by radiant energy of said given characteristic.

11. Apparatus as defined in claim 8 in which said means for comparing said first and second signals comprises an oscilloscope connected to receive said first and second signals and to generate a display representative of said first and second signals.

12. Apparatus as defined in claim 8 in which said means for directing said first and second radiant energy concentrations comprises a first optical system for focusing said first concentration of radiant energy on a first portion of said object plane, a second optical system for focusing said second concentration of radiant energy on a second portion of said object plane, and means for adjusting said optical systems.

13. Scanning apparatus for line-by-line scanning of a record medium to be scanned having, in each line to be scanned, a given maximum number of information bits, the apparatus comprising line scan means for generating a scanning line spaced apart from said record medium, said scanning line being adapted when reproduced on a sample record medium to read a number of information bits less than said given maximum number, and means for reproducing said scanning line on said record medium to be scanned an integral number of times at least substantially as great as said given maximum number divided by the number of information bits readable by said scanning line on said sample record medium, each reproduction of said scanning line having a maximum length substantially no greater than the length of each line to be scanned divided by the smallest integral permissible number of reproductions of said scanning line on said record medium, and the reproductions being positioned on said record medium so that, in the aggregate, they are coextensive with a line to be scanned.

14. In scanning apparatus, the combination of a radiant energy source adapted to generate a concentration of radiant energy moving linearly and repetitively between predetermined spatial limits first optical means disposed to receive said radiant energy concentration and to produce a first image thereof moving between second predetermined spatial limits on an object plane, second optical means disposed to receive said radiant energy concentration and to produce a second image thereof moving between third predetermined spatial limits on said object plane, first photosensitive means responsive to radiant energy from said first image, and second photosensitive means responsive to radiant energy from said second image, the lines traced by said first and second images being parallel and the beginning of the line traced by one of said images being substantially in registry with the end of the line traced by the other of said images.

References Cited by the Examiner

UNITED STATES PATENTS

| | | | |
|---|---|---|---|
| 2,538,065 | 1/1951 | Wallace | 178—6.8 |
| 2,648,838 | 8/1953 | Raymond | 178—6.8 |
| 2,859,653 | 11/1958 | Blackstone | 178—7.6 |
| 2,891,108 | 6/1959 | Wiens | 178—6.7 |
| 2,914,609 | 11/1959 | Blackstone | 178—6.8 |
| 2,953,638 | 9/1960 | Wintringham | 178—6 |
| 2,967,664 | 1/1961 | Ress | 178—6 |

DAVID G. REDINBAUGH, *Primary Examiner.*

E. JAMES SAX, *Examiner.*